(12) United States Patent
　　Cook et al.

(10) Patent No.: US 10,558,697 B2
(45) Date of Patent: Feb. 11, 2020

(54) SEGMENTING A SET OF MEDIA DATA USING A SET OF SOCIAL NETWORKING DATA

(71) Applicant: International Business Machines Corporation, Armonk, NY (US)

(72) Inventors: Alexander Cook, Rochester, MN (US); David M. Koster, Rochester, MN (US); Jason A. Nikolai, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 15/437,643

(22) Filed: Feb. 21, 2017

(65) Prior Publication Data

US 2018/0239759 A1　Aug. 23, 2018

(51) Int. Cl.
　　*G06F 16/40*　　(2019.01)
　　*G06Q 50/00*　　(2012.01)
　　*G06F 16/11*　　(2019.01)

(52) U.S. Cl.
　　CPC ............ *G06F 16/40* (2019.01); *G06F 16/122* (2019.01); *G06Q 50/01* (2013.01)

(58) Field of Classification Search
　　CPC ........ G06F 16/40; G06F 16/122; G06Q 50/01
　　USPC ......... 707/694, 728, 792; 704/230; 705/7.29
　　See application file for complete search history.

(56) References Cited

U.S. PATENT DOCUMENTS

| 8,290,999 | B2 * | 10/2012 | Shepherd ............... G06Q 50/01 707/728 |
| 8,346,540 | B2 | 1/2013 | Grigsby et al. |
| 8,473,325 | B2 * | 6/2013 | Barnhill, Jr. ........ H04L 12/2809 705/7.29 |
| 8,516,374 | B2 * | 8/2013 | Fleischman ............ G06Q 30/02 715/716 |
| 8,768,693 | B2 * | 7/2014 | Somekh ................... G06F 16/58 704/230 |
| 8,769,576 | B2 | 7/2014 | Burkitt et al. |
| 9,866,903 | B2 * | 1/2018 | Zheng ....................... H04N 5/76 |
| 2009/0172150 | A1 | 7/2009 | Alkov et al. |

(Continued)

FOREIGN PATENT DOCUMENTS

WO　WO 2015/101385 A1　7/2015

OTHER PUBLICATIONS

"Getting Started with AlchemyAPI", AlchemyAPI, http://www.alchemyapi.com/developers/getting-started-guide, Getting Starting Guide, retrieved from the internet Oct. 3, 2016, 4 pages.

(Continued)

*Primary Examiner* — Dung K Chau
(74) *Attorney, Agent, or Firm* — Francis Lammes; Stephen J. Walder, Jr.; L. Jeffrey Kelly

(57) ABSTRACT

A mechanism is provided for automated management of a set of media data using a set of social networking data. The set of social networking data related to a media event is collected. The set of social networking data related to the media event is correlated with the set of media data of the media event. Based on the set of social networking data, a determination is made of an inflection point of the media event. An inflection marker for the inflection point of the media event is then established with respect to the set of media data of the media event.

20 Claims, 4 Drawing Sheets

(56) References Cited

U.S. PATENT DOCUMENTS

| | | | |
|---|---|---|---|
| 2014/0052791 A1* | 2/2014 | Chakra | H04L 51/12 |
| | | | 709/206 |
| 2016/0173693 A1* | 6/2016 | Spievak | G06Q 30/0202 |
| | | | 379/265.09 |
| 2018/0239759 A1* | 8/2018 | Cook | G06Q 50/01 |

OTHER PUBLICATIONS

"OpenCV", Itseez, http://opencv.org, retrieved from the internet Oct. 3, 2016, 2 pages.
"Top 100 HashTags on Instagram", Top-Hashtags.com, https://top-hashtags.com/instagram/, retrieved from the internet Oct. 3, 2016, 6 pages.
"Trending", Facebook, https:www.facebook.com/help/1401671260054622, Facebook Help Center, retrieved from the internet Oct. 3, 2016, 1 page.
"Trending—YouTube", YouTube, https://www.youtube.com/trendsdashboard, retrieved from the internet Oct. 3, 2016, 3 pages.
"Trending on Twitter", #hashtags.org, https://www.hashtags.org/trending-on-twitter.html, retrieved from the internet Oct. 3, 2016, 3 pages.
Ballan, Lamberto et al., "Data-driven approaches for social image and video tagging", Springer, Multimedia Tools and Application, vol. 74, No. 4, Feb. 2015, pp. 1443-1468.
Grundmann, Matthias et al., "Efficient Hierarchical Graph-Based Video Segmentation", IEEE CVPR, http://www.cc.gatech.edu/cpl/projects/videosegmentation/, Jun. 2010, 3 pages.
Highfield, Tim et al., "A methodology for mapping Instagram hashtags", First Monday, http://firstmonday.org/article/view/5563/4195, vol. 20, No. 1-5, Jan. 2015, 13 pages.

* cited by examiner

SEGMENTING A SET OF MEDIA DATA USING A SET OF SOCIAL NETWORKING DATA

BACKGROUND

The present application relates generally to an improved data processing apparatus and method and more specifically to mechanisms for segmenting a set of media data using a set of social networking data.

A digital video recorder (DVR), sometimes referred to by the merchandising term personal video recorder (PVR), is a consumer electronics device or application software that records video in a digital format to a disk drive, USB flash drive, SD memory card, SSD or other local or networked mass storage device. DVRs have changed the way people interact with television. The user's task has changed from (a) finding something to watch from 100+ channels to (b) finding something to record from 10,000+ weekly shows. By monitoring shows users watch and by providing an interface for rating shows, DVRs construct user profiles that allow them to recommend and automatically record programs.

Currently, many of the programs that are recorded on DVRs may be analyzed by retrieval applications that use visual, audio, and transcript data so that the programs may be segmented and indexed in order for a user to find and record specific video clips that match requests in the users' profiles. Thus, these retrieval applications offer an environment where users interact with whole programs and video clips organized by topic.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for automated management of a set of media data using a set of social networking data. The illustrative embodiment collects the set of social networking data related to a media event. The illustrative embodiment correlates the set of social networking data related to the media event with the set of media data of the media event. The illustrative embodiment determines, based on the set of social networking data, an inflection point of the media event. The illustrative embodiment establishes, with respect to the set of media data of the media event, an inflection marker for the inflection point of the media event.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
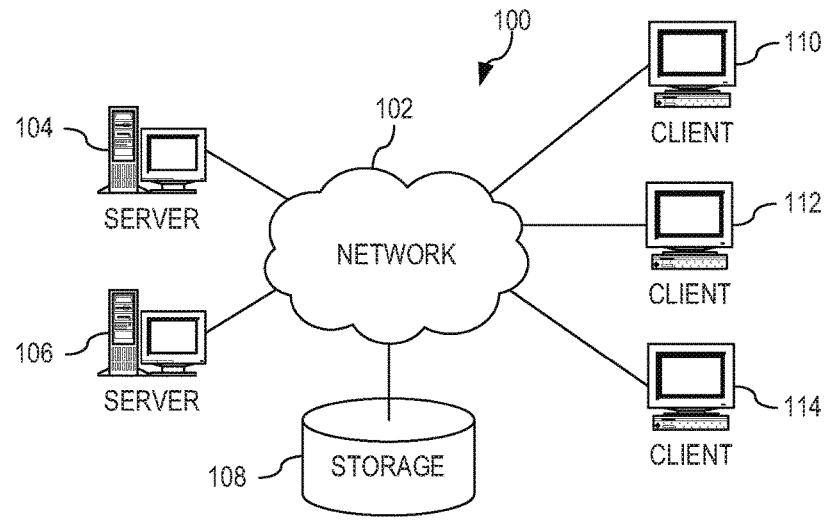
FIG. 1 is an example diagram of a distributed data processing system in which aspects of the illustrative embodiments may be implemented.

The illustrative embodiments provide mechanisms for segmenting a set of media data using a set of social networking data. As noted above, many of the programs that are recorded on DVRs may be analyzed by retrieval applications that use visual, audio, and transcript data so that the programs may be segmented and indexed in order for a user to find and record specific video clips that match requests in the user's profile. Thus, these retrieval applications offer an environment where users interact with whole programs and video clips organized by topic. However, these retrieval application are only suited to a particular user. That is, currently, many people have an on demand mind set and pay for on-demand services to avoid watching commercials and view or hear what they want, when they want. However, there are many events where users only want to see portions of the events, i.e. portions of the event that are trending on social media. Yet, the current retrieval applications only work on the user's profile and not on trending topics.

Therefore, the illustrative embodiments provide a social-media enabled segmentation mechanism that segments a set of media data using a set of social networking data. That is, the social-media enabled segmentation mechanism uses trending topics on social media, such as Twitter®, Snapchat®, Facebook®, etc. to determine when interesting portions of an event occur. The social-media enabled segmentation mechanism then uses the identified timing of these trending topics as a starting point to create automatic segmentation of media data, i.e. audio data, video data, video/audio data, or the like. The social-media enabled segmentation mechanism utilizes language processing along with streaming analytics to correlate trending topics via trending reports, hash tags, text analytics, or the like, with the event. That is, as the event is streamed and stored for playback as a set of media data, the social-media enabled segmentation mechanism monitors social networking data for a set of social networking data related to the event using language processing. From the trending topics identified in the set of social networking data, the social-media enabled segmentation mechanism automatically tags one or more portions of the set of media data with trending topic identifiers in order for a user to jump to a particular portion of the set of media data based on the trending topic identifiers. Additionally, the social-media enabled segmentation mechanism may extract and compile subsets of the set of media data into one or more clips from the live event.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
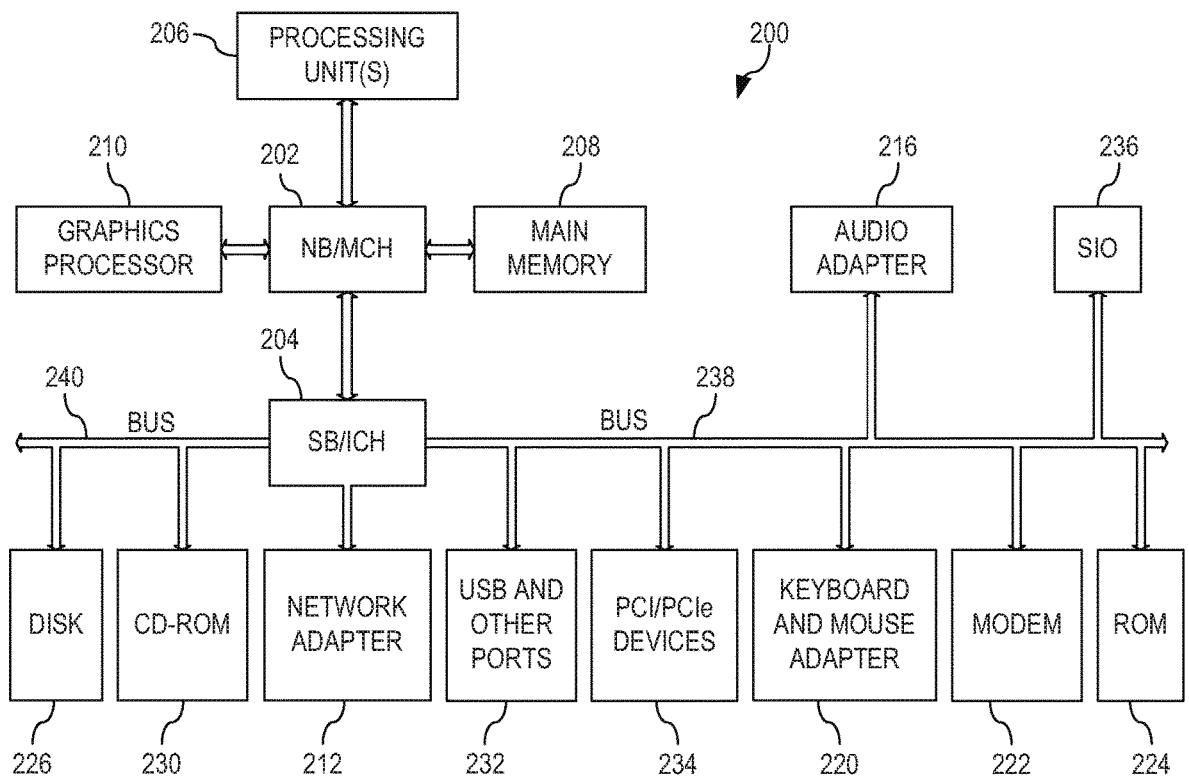
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a social-media enabled segmentation mechanism that segments a set of media data using a set of social networking data. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates segmenting a set of media data using a set of social networking data.

As noted above, the mechanisms of the illustrative embodiments utilize specifically configured computing devices, or data processing systems, to perform the operations for segmenting a set of media data using a set of social networking data. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the segmenting a set of media data using a set of social networking data.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
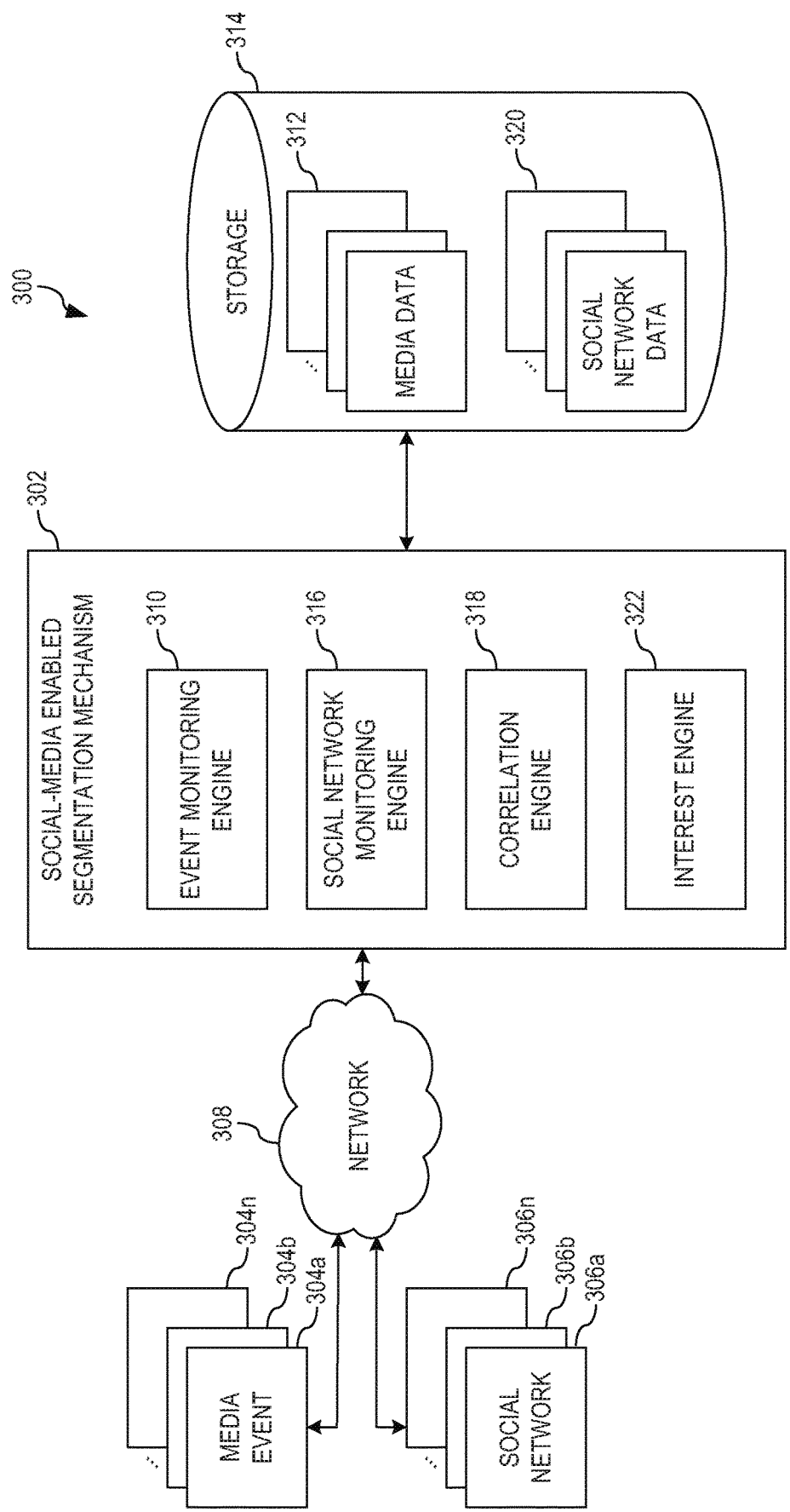
FIG. 3 depicts an exemplary functional block diagram of a social-media enabled segmentation mechanism that segments a set of media data using a set of social networking data in accordance with an illustrative embodiment.

FIG. 3 depicts an exemplary functional block diagram of a social-media enabled segmentation mechanism that segments a set of media data using a set of social networking data in accordance with an illustrative embodiment. Data processing system 300 comprises social-media enabled segmentation mechanism 302 that is coupled to a set of media events 304a-304n and a set of social networks 306a-306n via network 308. As will be illustrated, social-media enabled segmentation mechanism 302 operates in an automated fashion without user intervention. In order to correlate a set of social network data from one or more social networks in the set of social networks 306a-306n to one or more portions of a set of media data from a media event in the set of media events 304a-304n, event monitoring engine 310 in social-media enabled segmentation mechanism 302 initially streams the media event, which may be an audio event, a video event, or a combination thereof either live or previously recorded, storing the data of the media event as a set of media data 312 in storage 314.

While event monitoring engine 310 is streaming the data packets of the media event into the set of media data 312, event monitoring engine 310 also analyzes data associated with the media event to determine a meaning of content as well as important points within the media event. The data may be metadata that is embedded within the data packets, data obtained via speech-to-text analysis of the audio portion of the media event, data obtained via video analysis (i.e. optical character recognition, facial recognition, object recognition, image recognition, or the like) of the video portion of the media event, or the like. The important points within the media event are associated with events within the media event and may be identified based on inflection, such as, for example with regard to a football game, when announcers voices rise in inflection, when the sound of the crown rises in inflection, when a graphic display shows "TOUCHDOWN," or the like, or, conversely, when the inflection lowers or no or little sound is present at all, such as when a player is hurt.

Additionally, while analyzing the data associated with the media event, event monitoring engine 310 may also identify breaks, pauses, changes, or the like, in the content. For example, if the media event is a music concert, event monitoring engine 310 may be able to identify when one song ends and another begins. Using this identification of a break, pause, change, or the like, event monitoring engine 310 uses these identifications to form one or more segments of the media event. That is, one or more segments in the set of media data 312, when combined, form the original media event.

With an identification of the content of the media event identified, social network monitoring engine 316 in social-media enabled segmentation mechanism 302 monitors the set of social networks 306a-306n for social network data associated with the identified content. The social network data may be data that is already electronically stored as well as live data in flight. Social network monitoring engine 316 analyzes the social network data associated with the identified content via different analysis, e.g., comparisons, natural language analysis, lexical analysis, or the like, in order to identify a temporal element as well as tone, sentiment, content, subject matter, or the like, from the social network data, which, in addition to text, may include pictures, memes, icons, or the like. In analyzing the social network data, social network monitoring engine 316 detects "relevant changes" in portions of the media event that occur at specific points in time. Once a "relevant change", which may also be referred to a "trending topic," is identified, social network monitoring engine 316 stores each "relevant change" as social network data in a set of social network data 320 in storage 314.

Using the set of media data 312 and the set of social network data 320, correlation engine 318 correlates each social network data in the set of social network data 320 to a corresponding portion of media data in the set of media data 312. This is best described by way of example, when a football game is the media event that is being monitored and analyzed by social-media enabled segmentation mechanism 302, correlation engine 318 uses the set of media data 312 generated by event monitoring engine 310 and the set of social network data 320 generated by social network monitoring engine 316 to identify inflection points within the set of social network data 320.

Correlation engine 318 looks for significant changes that may have occurred in the set of social network data 320 during the time and shortly after the time the media event is being broadcast. Correlation engine 318 examines spikes in the set of social network data 320 mentioning any of the teams, players, coaches, or the like associated with the football game. For any particular inflection point in the social network data of the set of social network data 320 that is equal to or above a predetermined threshold, which may be identified utilizing an ontological data to weigh the results of social network data, correlation engine 318 generates an inflection marker. Correlation engine 318 then correlates the inflection marker associated with the inflection point within the set of social network data 320 to the set of media data 312. This correlation is not only based on a time associated with the inflection point, as based on time markers associated with each of the set of social network data 320 and time markers associated with the set of media data 312, but also the important points within the media event. That is, social network data within the set of social network data 320 occurs after the actual event within the media event. Thus, correlation engine 318 attempts to match the inflection points identified within the set of social network data 320 to important points within the set of media data 312. If correlation engine 318 is able to substantially match, i.e. within a predetermined threshold, an inflection point in the set of social network data 320 to an important point within the set of media data 312, correlation engine 318 places the inflection marker at that point within the set of media data 312. If correlation engine 318 is not able to match the inflection point in the set of social network data 320 to an important point within the set of media data 312, correlation engine 318 places the inflection marker at the an average time of the set of social network data 320 associated with the inflection point within the set of media data.

Besides simply determining a moment of interest within the set of media data 312, correlation engine 318 may also determine a linkage of interest that defines the inflection marker itself. Correlation engine 318 may enlist interest engine 322 that utilizes sentiment analysis, content tagging, or the like, to expose a sentiment of users that posted the social network data in the set of social network data 320. For example, if the social network data includes "smiley face" or "thumbs up" emojis, then interest engine 322 would identify that the inflection marker should be "positive." Conversely, if the social network data includes "sad face" or "thumbs down" emojis, then interest engine 322 would identify that the inflection marker should be "negative." Emojis are just one way of identifying the sentiment of the social network data, interest engine 322 may uses language processing to determine the interest of the text in the social network data. It is recognized that "positive" and "negative" are just examples of the interest that may be identified. Interest engine 322 may use any type of interest identifier or interest engine 322 may utilize a predetermined list of "interest categories" to classify the interest of the social network data.

With one or more inflection markers identified with the set of media data 312 associated with the media event, presentation engine 324 may present the user with playback of the media event with options for the user to jump to a particular portion of the media event using the inflection markers. That is, if a person is watching the football game in replay, watching live but missed some of the football game, or the like, presentation engine 324 provides a summary of the football game with inflections markers. Based on hearing about some event within the football game, the user may see the inflection points and, by selecting one of the inflection markers, jump to that portion of the media event, i.e. the football game. However, just viewing the event associated with the inflection marker may not give the user the complete story of how the event within the media event occurred. Thus, presentation engine 324 also provides the user with the option to back up to the beginning of the segment with which the inflection marker is associated, backing up to a previous inflection marker, or backing up some predetermined time period, such as 1 minute, 5 minutes, 10 minutes, or the like.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4A:
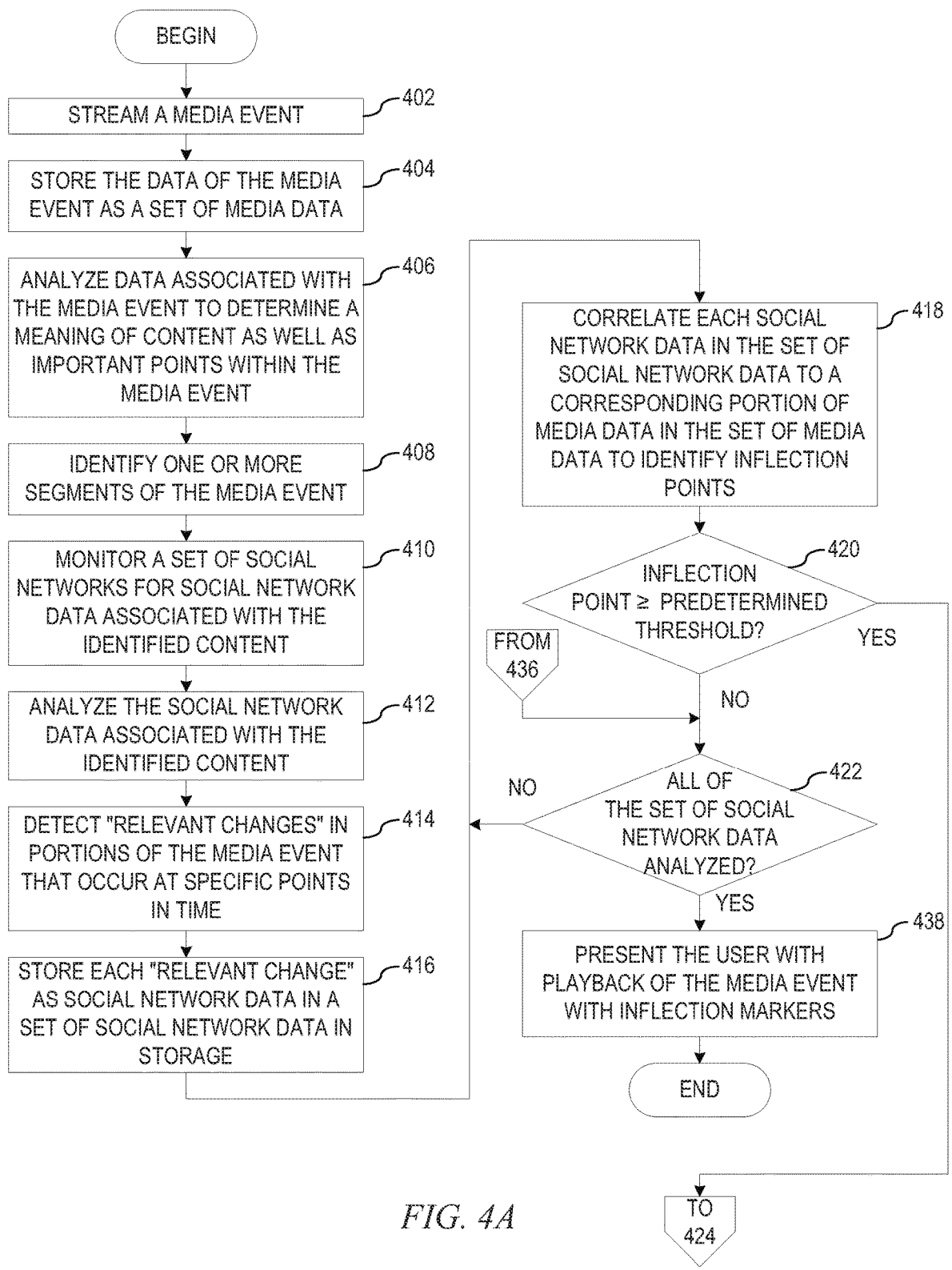
FIGS. 4A and 4B depict an exemplary flow diagram of one operation performed by a social-media enabled segmentation mechanism in segmenting a set of media data using a set of social networking data in accordance with an illustrative embodiment.
Figure 4B:
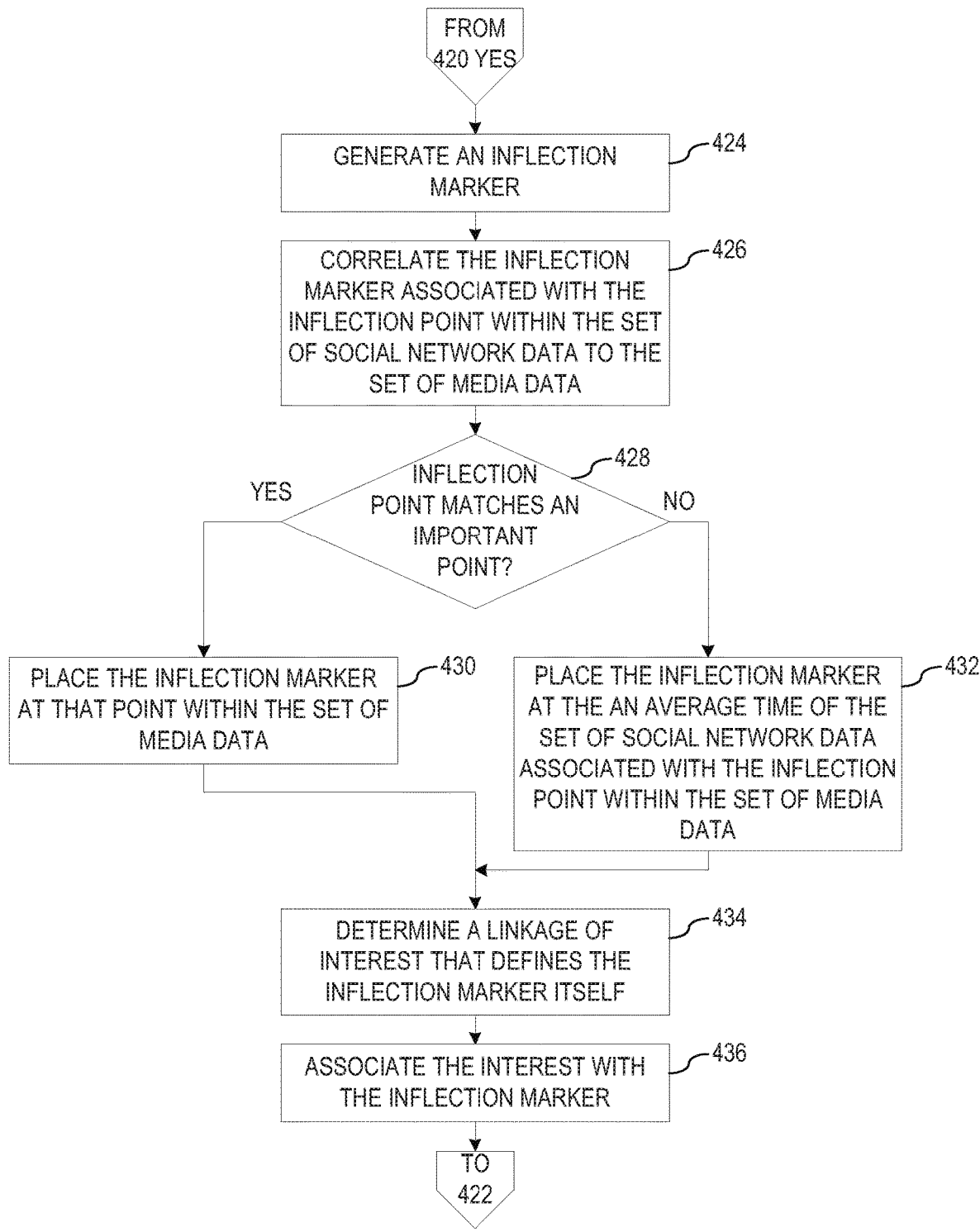

FIGS. 4A and 4B depict an exemplary flow diagram of one operation performed by a social-media enabled segmentation mechanism in segmenting a set of media data using a set of social networking data in accordance with an illustrative embodiment. As the operation begins, social-media enabled segmentation mechanism streams a media event (step 402), which may be an audio event, a video event, or a combination thereof, either live or previously recorded. The social-media enabled segmentation mechanism stores the data of the media event as a set of media data in storage (step 404). The social-media enabled segmentation mechanism analyzes data associated with the media event to determine a meaning of content as well as important points within the media event (step 406). The data may be metadata that is embedded within the data packets, data obtained via speech-to-text analysis of the audio portion of the media event, data obtained via video analysis (i.e. optical character recognition, facial recognition, object recognition, image recognition, or the like) of the video portion of the media event, or the like. The important points within the media event are associated with events within the media event and may be identified based on inflection, such as, for example with regard to a football game, when announcers voices rise in inflection, when the sound of the crown rises in inflection, when a graphic display shows "TOUCHDOWN," or the like, or, conversely, when the inflection lowers or no or little sound is present at all, such as when a player is hurt. The social-media enabled segmentation mechanism further identifies breaks, pauses, changes, or the like, in the media even in order to form one or more segments of the media event (step 408). That is, one or more segments in the set of media data, when combined, form the original media event.

With an identification of the content of the media event identified, the social-media enabled segmentation mechanism monitors a set of social networks for social network data associated with the identified content (step 410). The social network data may be data that is already electronically stored as well as live data in flight. The social-media enabled segmentation mechanism analyzes the social network data associated with the identified content (step 412) via different analysis, e.g., comparisons, natural language analysis, lexical analysis, or the like, in order to identify a temporal element as well as tone, sentiment, content, subject matter, or the like, from the social network data, which, in addition to text, may include pictures, memes, icons, or the like. In analyzing the social network data, the social-media enabled segmentation mechanism detects "relevant changes" in portions of the media event that occur at specific points in time (step 414). Once a "relevant change", which may also be referred to a "trending topic," is identified, the social-media enabled segmentation mechanism stores each "relevant change" as social network data in a set of social network data in storage (step 416).

Using the set of media data and the set of social network data, the social-media enabled segmentation mechanism correlates each social network data in the set of social network data to a corresponding portion of media data in the set of media data to identify inflection points (step 418). The social-media enabled segmentation mechanism looks for significant changes that may have occurred in the set of social network data during the time and shortly after the time the media event is being broadcast. For any particular inflection point identified in the social network data of the set of social network data, the social-media enabled segmentation mechanism determines whether the inflection point is equal to or above a predetermined threshold (step 420), which may be identified utilizing an ontological data to weigh the results of social network data. If at step 420 the weight of the inflection point fails to be equal to or above the predetermined threshold, the social-media enabled segmentation mechanism determined whether all of the set of social network data has been analyzed (step 422). If at step 422 the social-media enabled segmentation mechanism determines that not all of the set of social network data has been analyzed, then the operation returns to step 418.

If at step 420 the weight of the inflection point is above the predetermined threshold, the social-media enabled segmentation mechanism generates an inflection marker (step 424). The social-media enabled segmentation mechanism then correlates the inflection marker associated with the inflection point within the set of social network data to the set of media data (step 426). This correlation is not only based on a time associated with the inflection point, as based on time markers associated with each of the set of social network data and time markers associated with the set of media data, but also the important points within the media event. That is, social network data within the set of social network data occurs after the actual event within the media event. Thus, the social-media enabled segmentation mechanism attempts to match the inflection points identified within the set of social network data to important points within the set of media data (step 428). If at step 428 the social-media enabled segmentation mechanism is able to match the inflection points identified within the set of social network data to important points within the set of media data, the social-media enabled segmentation mechanism places the inflection marker at that important point within the set of media data (step 430).

If at step 428 the social-media enabled segmentation mechanism is not able to match the inflection point in the set of social network data to an important point within the set of media data, the social-media enabled segmentation mechanism places the inflection marker at the an average time of the set of social network data associated with the inflection point within the set of media data (step 432). The social-media enabled segmentation mechanism also determines a linkage of interest that defines the inflection marker itself (step 434). The social-media enabled segmentation mechanism utilizes sentiment analysis, content tagging, or the like, to expose a sentiment of users that posted the social network data in the set of social network data. Once the interest is identified, the social-media enabled segmentation mechanism associates the interest with the inflection marker (step 436), with the operation proceeding to step 422 thereafter.

If at step 422 the social-media enabled segmentation mechanism determines that all of the set of social network data has been analyzed, the social-media enabled segmentation mechanism present the user with playback of the media event with options for the user to jump to a particular portion of the media event using the inflection markers (step 438), with the operation ending thereafter. That is, if a person is watching the football game in replay, watching live but missed some of the football game, or the like, the social-media enabled segmentation mechanism provides a summary of the football game with inflections markers. Based on hearing about some event within the football game, the user may see the inflection points and, by selecting one of the inflection markers, jump to that portion of the media event, i.e. the football game. However, just viewing the event associated with the inflection marker may not give the user the complete story of how the event within the media event occurred. Thus, the social-media enabled segmentation mechanism also provides the user with the option to back up to the beginning of the segment with which the inflection marker is associated, backing up to a previous inflection marker, or backing up some predetermined time period, such as 1 minute, 5 minutes, 10 minutes, or the like.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for taking live social network data and correlating the timing of the social network data to a media event through inflection markers identifying interesting content within the media event. In order to do this, the social-media enabled segmentation mechanism collects a set of social networking data related to an event and correlates the set of social networking data related to the event with a set of media data of the event. The social-media enabled segmentation mechanism determines, based on the set of social networking data, an inflection point of the event and establishes, with respect to the set of media data of the event, an inflection marker for the inflection point of the event.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for automated management of a set of media data using a set of social networking data, the method comprising:

analyzing the set of media data associated with a media event to determine a meaning of the set of media data;

identifying one or more important points within the media event based on an inflection identified from audio associated with the media event;

collecting the set of social networking data related to the media event;

correlating the set of social networking data related to the media event with the set of media data of the media event;

determining an inflection point within the media event based on a change in the set of social networking data and an important point from the one or more important points within the media event; and establishing, with respect to the set of media data of the media event, an inflection marker for the inflection point of the media event.

2. The method of claim 1, further comprising:
partitioning, based on the inflection marker for the inflection point, the set of media data.

3. The method of claim 1, wherein determining the inflection point of the media event further comprises:
identifying an existence of a change in the set of social networking data.

4. The method of claim 3, wherein determining the inflection point of the media event further comprises:
ascertaining an interest of the change in the set of social networking data.

5. The method of claim 4, wherein ascertaining the interest of the change in the set of social networking data further comprises:
weighting, using a set of ontological data interrelated with the event, the set of social networking data.

6. The method of claim 1, wherein the inflection point includes one or more elements or factors, wherein the one or more elements or factors are selected from the group consisting of a temporal element, a tone factor, a sentiment factor, a content factor, and a subject matter feature.

7. The method of claim 1, wherein the collecting, the correlating, the determining, and the establishing each occur in an automated fashion without user intervention.

8. A computer program product for automated management of a set of media data using a set of social networking data comprising a computer readable storage medium having a computer readable program stored therein, wherein the computer readable program, when executed on a computing device, causes the computing device to:
analyze the set of media data associated with a media event to determine a meaning of the set of media data;
identify one or more important points within the media event based on an inflection identified from audio associated with the media event;
collect the set of social networking data related to the media event;
correlate the set of social networking data related to the media event with the set of media data of the media event;
determine an inflection point within the media event based on a change in the set of social networking data and an important point from the one or more important points within the media event; and
establish, with respect to the set of media data of the media event, an inflection marker for the inflection point of the media event.

9. The computer program product of claim 8, wherein the computer readable program further causes the computing device to:
partition, based on the inflection marker for the inflection point, the set of media data.

10. The computer program product of claim 8, wherein the computer readable program for determining the inflection point of the media event further causes the computing device to:
identify an existence of a change in the set of social networking data.

11. The computer program product of claim 10, wherein the computer readable program for determining the inflection point of the media event further causes the computing device to:
ascertain an interest of the change in the set of social networking data.

12. The computer program product of claim 11, wherein the computer readable program for ascertaining the interest of the change in the set of social networking data further causes the computing device to:
weight, using a set of ontological data interrelated with the event, the set of social networking data.

13. The computer program product of claim 8, wherein the inflection point includes one or more elements or factors, wherein the one or more elements or factors are selected from the group consisting of a temporal element, a tone factor, a sentiment factor, a content factor, and a subject matter feature.

14. The computer program product of claim 8, wherein the computer readable program to collect, correlate, determine, and establish each occur in an automated fashion without user intervention.

15. An apparatus for automated management of a set of media data using a set of social networking data comprising:
a processor; and
a memory coupled to the processor, wherein the memory comprises instructions which, when executed by the processor, cause the processor to:
analyze the set of media data associated with a media event to determine a meaning of the set of media data;
identify one or more important points within the media event based on an inflection identified from audio associated with the media event;
collect the set of social networking data related to the media event;
correlate the set of social networking data related to the media event with the set of media data of the media event;
determine an inflection point within the media event based on a change in the set of social networking data and important point from the one or more important points within the media event; and
establish, with respect to the set of media data of the media event, an inflection marker for the inflection point of the media event.

16. The apparatus of claim 15, wherein the instructions further cause the processor to:
partition, based on the inflection marker for the inflection point, the set of media data.

17. The apparatus of claim 15, wherein the instructions for determining the inflection point of the media event further cause the processor to:
identify an existence of a change in the set of social networking data.

18. The apparatus of claim 17, wherein the instructions for determining the inflection point of the media event further cause the processor to:
ascertain an interest of the change in the set of social networking data.

19. The apparatus of claim 18, wherein the instructions for ascertaining the interest of the change in the set of social networking data further cause the processor to:
weight, using a set of ontological data interrelated with the event, the set of social networking data.

20. The apparatus of claim 15, wherein the inflection point includes one or more elements or factors, wherein the one or more elements or factors are selected from the group consisting of a temporal element, a tone factor, a sentiment factor, a content factor, and a subject matter feature.

* * * * *